United States Patent
Mayr et al.

(10) Patent No.: US 11,879,535 B2
(45) Date of Patent: Jan. 23, 2024

(54) BEARING ASSEMBLY FOR PULLEY

(71) Applicant: Schaeffler Technologies AG & Co. KG, Herzogenaurach (DE)

(72) Inventors: Ulrich Mayr, Mount Holly, NC (US); Steven Kleinheinz, Fort Mill, SC (US); Carl White, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 108 days.

(21) Appl. No.: 17/718,706

(22) Filed: Apr. 12, 2022

(65) Prior Publication Data
US 2023/0323938 A1 Oct. 12, 2023

(51) Int. Cl.
*F16H 55/36* (2006.01)
*F16C 19/34* (2006.01)

(52) U.S. Cl.
CPC ............ *F16H 55/36* (2013.01); *F16C 19/34* (2013.01)

(58) Field of Classification Search
CPC .... F16H 55/36; F16H 2055/366; F16H 55/50; F16H 7/04; F16H 7/20; F16C 19/34; F16C 2361/63

USPC ......................................................... 474/135
See application file for complete search history.

(56) References Cited

U.S. PATENT DOCUMENTS

| | | | |
|---|---|---|---|
| 5,427,581 A * | 6/1995 | McGrath ............... | F16H 7/1254 474/112 |
| 10,822,202 B2 * | 11/2020 | Lee ......................... | B66B 15/04 |
| 2016/0236917 A1 * | 8/2016 | Walton ................... | F16H 55/36 |
| 2020/0347923 A1 * | 11/2020 | Mangapora ......... | F16H 57/0031 |

* cited by examiner

*Primary Examiner* — Gene O Crawford
*Assistant Examiner* — Emily R Kincaid
(74) *Attorney, Agent, or Firm* — Volpe Koenig

(57) ABSTRACT

A pulley assembly is disclosed herein that includes a shaft having a shaft length. A plurality of rolling elements are supported on a radially outer surface of the at least one shaft. In one aspect, the plurality of rolling elements are cylindrical rollers, the cylindrical rollers can each have a rolling element length and a rolling element diameter, and a ratio of the rolling element length to the rolling element diameter can be at least 1.0. A pulley is provided that surrounds the plurality of rolling elements, the pulley defines an outer raceway for the rolling elements, and the pulley defines a support surface configured to support a cable. A pair of washers are also arranged on axially opposite outer sides of the pulley and the rolling elements.

20 Claims, 7 Drawing Sheets

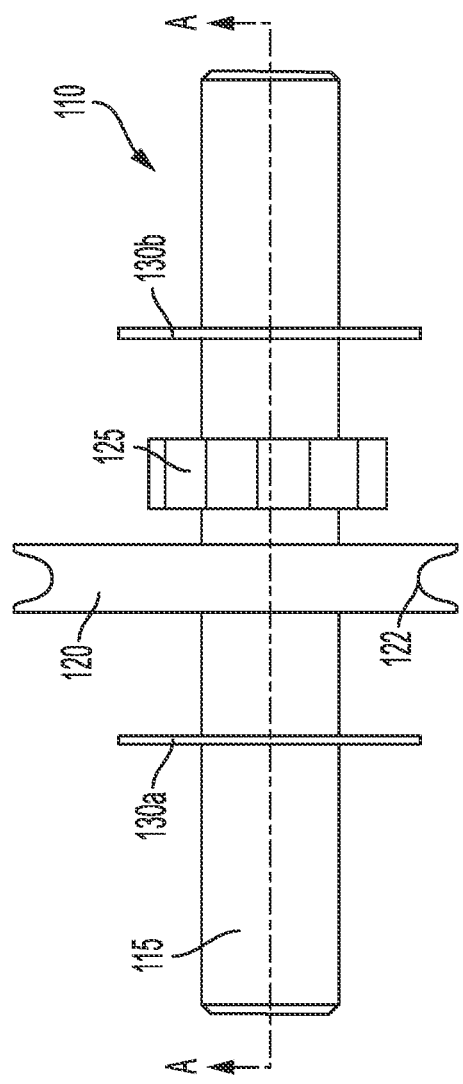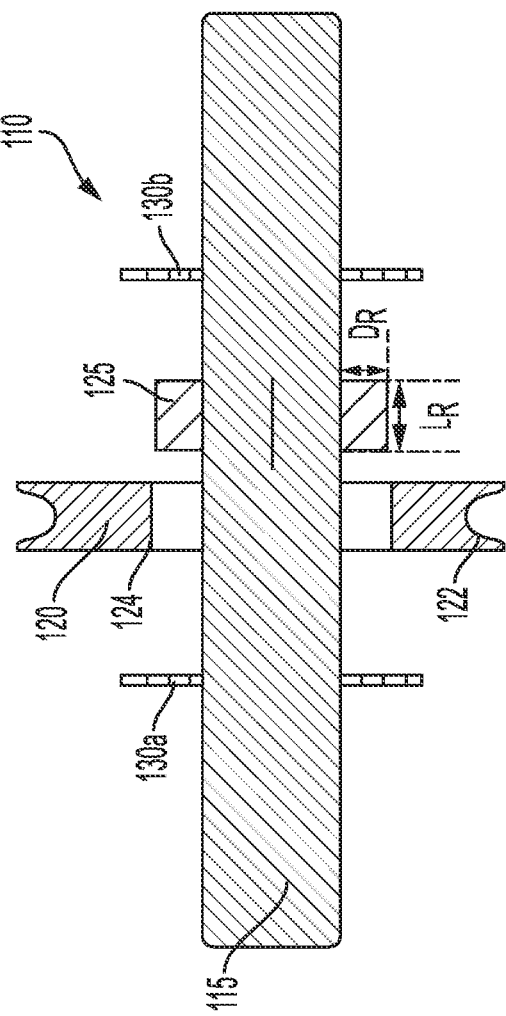

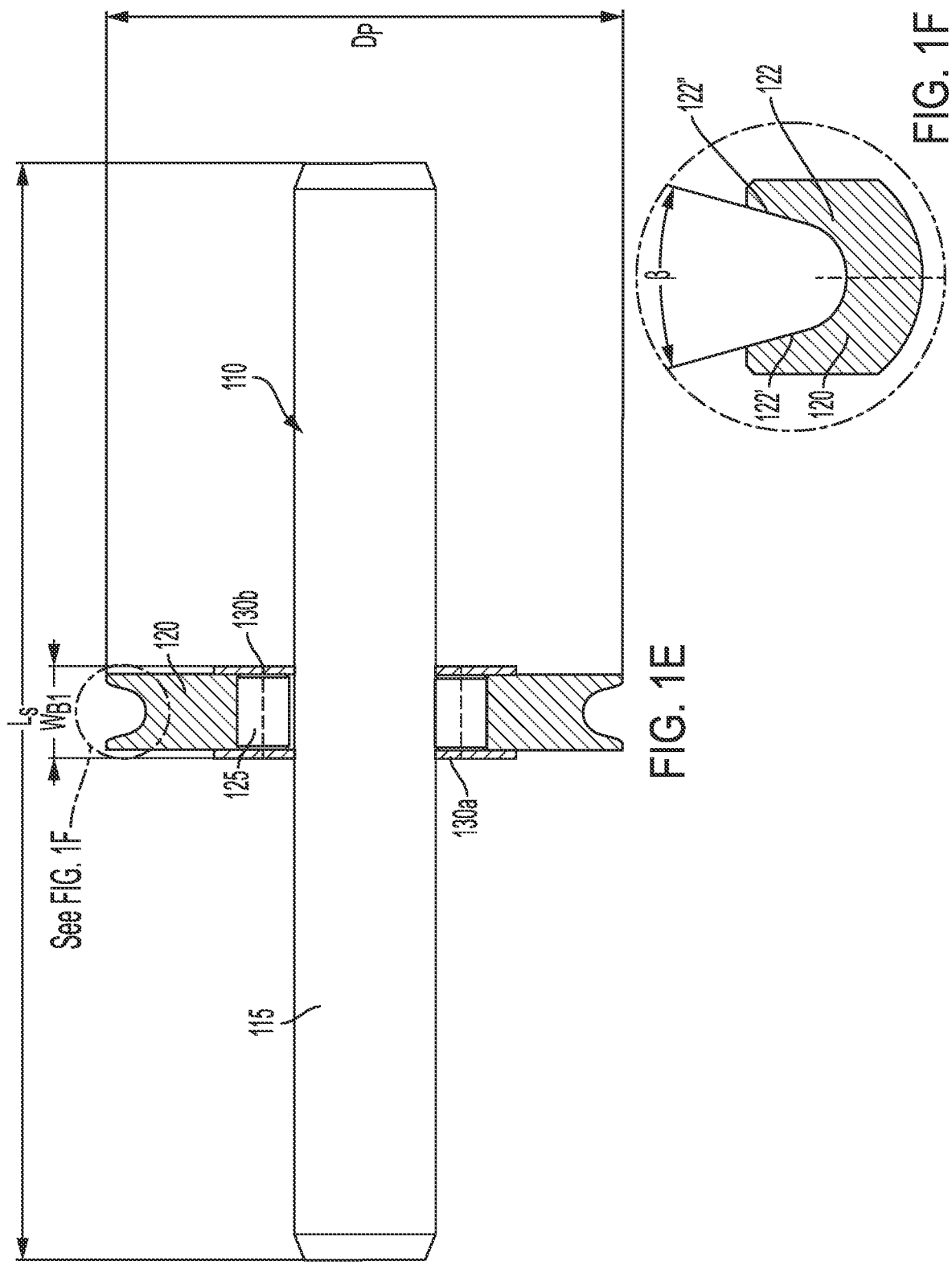

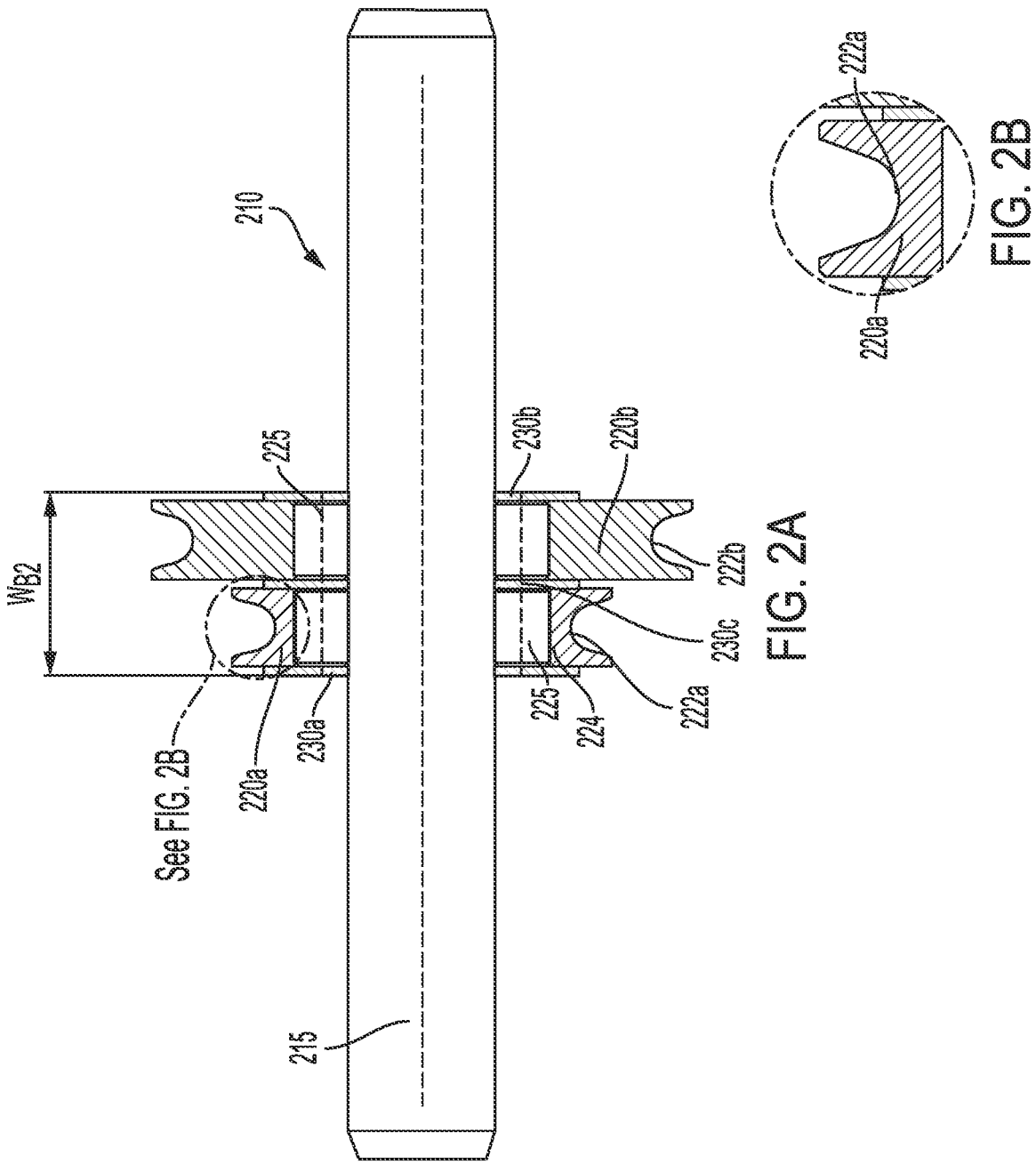

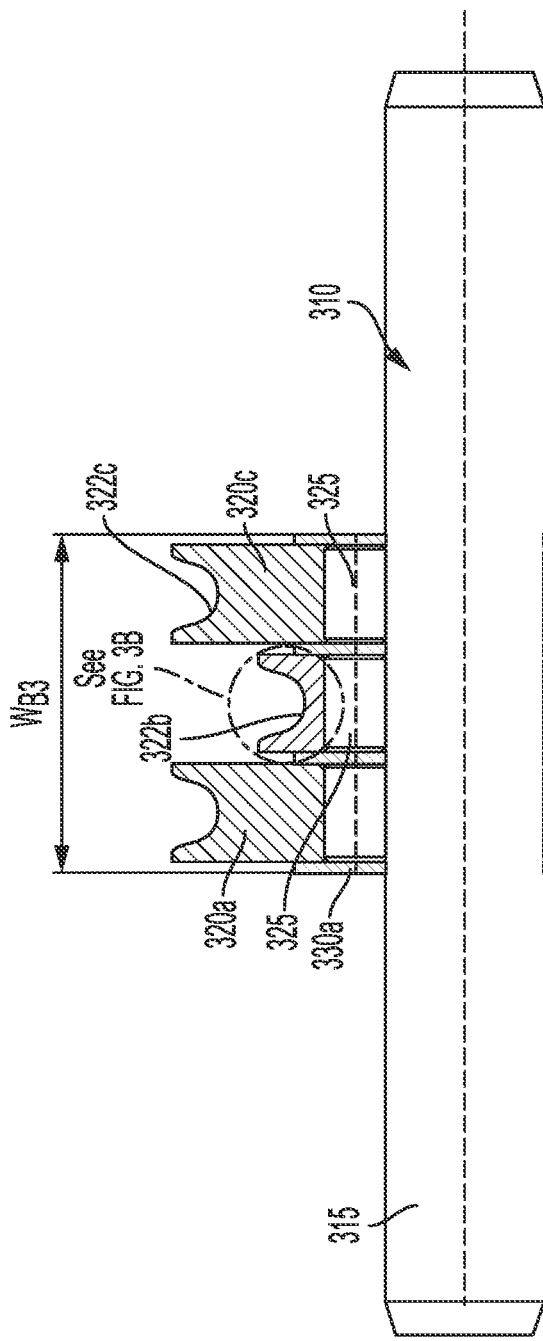
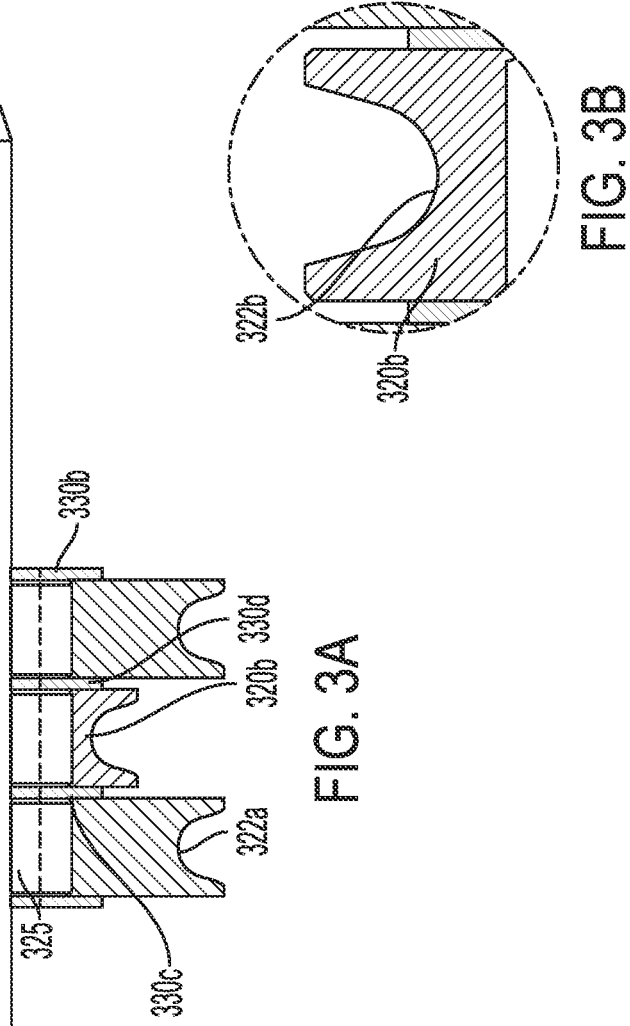

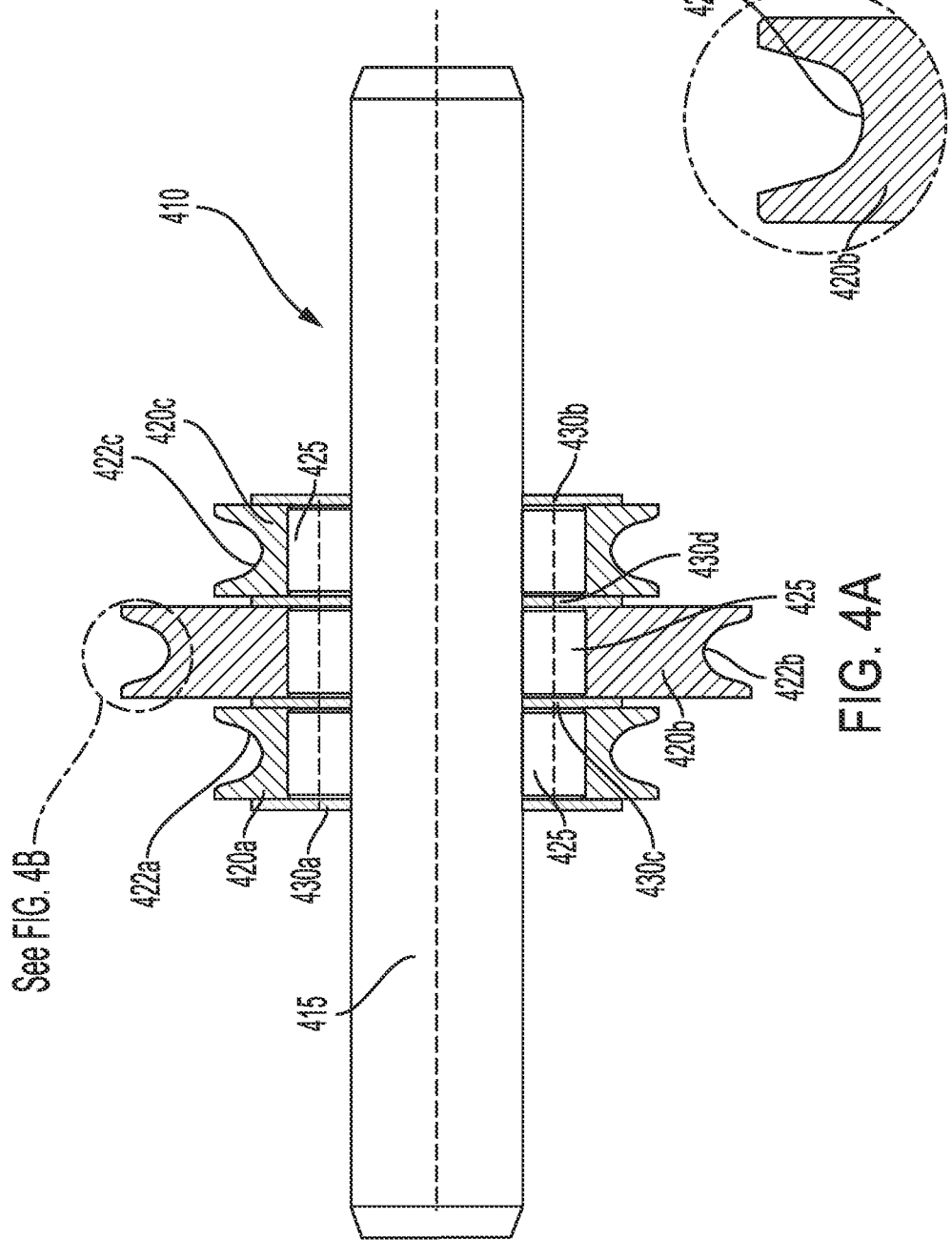

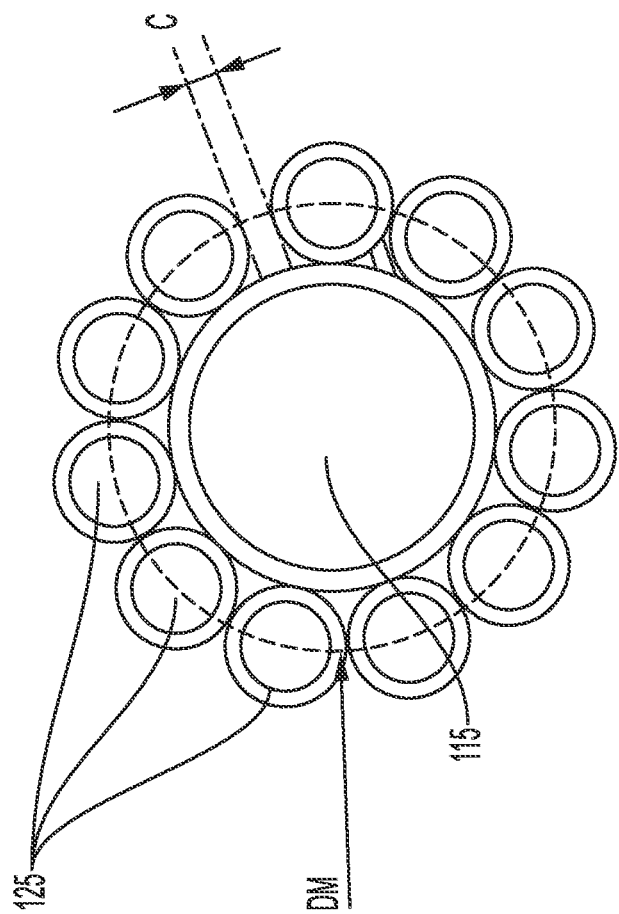

BEARING ASSEMBLY FOR PULLEY

FIELD OF INVENTION

The present disclosure relates to a bearing assembly for a pulley drive.

BACKGROUND

Pulley assemblies including bearing are well known. One known such arrangement, particularly in the medical field, uses a coated pulley that is supported directly on a coated pin. A cable or traction element is then supported on a surface of the bearing for a cable drive. The cable drive in these known arrangements can be used to position or actuate surgical tools, such as stapling tools, cutting tools, etc. The known pulley assemblies for these arrangements suffer from excessive friction, which leads to failure. These pulley assemblies also must undergo rigorous sanitizing protocols, typically requiring an autoclave and high temperatures.

Accordingly, it would be desirable to provide a reliable bearing configuration for a pulley assembly that is also durable.

SUMMARY

A pulley assembly is disclosed herein that is compact and configured for use in specific applications having a relatively small envelope, that is also durable and reduces friction between the supported components.

The pulley assembly can include a shaft having a predetermined shaft length. A plurality of rolling elements are supported on a radially outer surface of the at least one shaft. In one aspect, the plurality of rolling elements are cylindrical rollers. The cylindrical rollers can each have a rolling element length and a rolling element diameter, and a ratio of the rolling element length to the rolling element diameter can be at least 1.0. A pulley is provided that surrounds the plurality of rolling elements. The pulley defines an outer raceway for the rolling elements, and the pulley defines a support surface configured to support a cable. A pair of washers are also arranged on axially opposite outer sides of the pulley and the rolling elements.

The ratio of the rolling element length to the rolling element diameter can be at least 1.33. In one aspect, this ratio can be at least 1.5, and is no less than 0.75.

The rolling elements can be configured to be circumferentially supported against each other, i.e. without a cage or other support. A total clearance defined along a pitch diameter of the plurality of rolling elements can be less than 0.40 mm. This helps prevent any skewing of the rolling elements.

The shaft, the rolling elements, the pulley, and the washers can each be formed from steel.

In one aspect, the pulley includes a single pulley. In another aspect, the pulley can include a first pulley and a second pulley, the first pulley can have a first outer diameter and a first inner diameter, the second pulley can have a second outer diameter and a second inner diameter, and the first and second outer diameters can be different and the first and second inner diameters can be identical. At least one additional washer can be arranged between the first and the second pulley. The first outer diameter can be at least 40% larger than the second outer diameter of the pulleys.

The pulley can include a first pulley, a second pulley, and a third pulley, in another aspect. The first pulley and the third pulley can each have a first outer diameter, and the second pulley has a second outer diameter that is different than the first outer diameter. At least one first additional washer can be arranged between the first and second pulley, and at least one second additional washer can be arranged between the second and third pulley.

The support surface of the pulley can have a varying radius of curvature, and a first and second flank defined on opposing areas defined adjacent to respective shoulders of the pulley. An angle defined between the first and second flanks can be 20 degrees-40 degrees.

In one aspect, a bearing width defined between axially outer faces of the washers is less than 30% of the shaft length. In another aspect, the bearing width is less than 20% of the shaft length, and in yet another aspect the bearing width is less than 10% of the shaft length.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 1A is a side view of a pulley assembly prior to assembly.

FIG. 1B is a side cross-sectional view of the pulley assembly prior to assembly.

FIG. 1E is a side cross-sectional view of the pulley assembly of FIGS. 1A-1D.

FIG. 1F is a magnified view of region "1F" from FIG. 1E.

FIG. 2A is a cross-sectional view of a pulley assembly according to another aspect.

FIG. 2B is a magnified view of region "2B" from FIG. 2A.

FIG. 3A is a cross-sectional view of a pulley assembly according to another aspect.

FIG. 3B is a magnified view of region "3B" from FIG. 3A.

FIG. 4A is a cross-sectional view of a pulley assembly according to another aspect.

FIG. 4B is a magnified view of region "4B" from FIG. 4A.

FIG. 5 is an axial end view of rolling elements on a shaft.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import. The term approximately is used herein to mean within 10%-20% of a stated value, in one aspect.

Figure 1C:
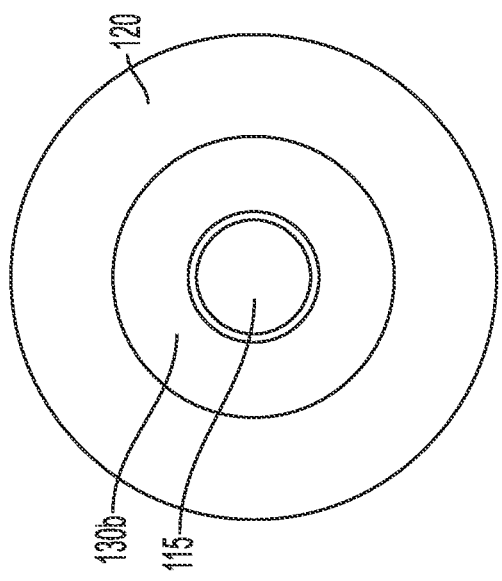
FIG. 1C is an end view of the pulley assembly of FIGS. 1A and 1B.
Figure 1D:
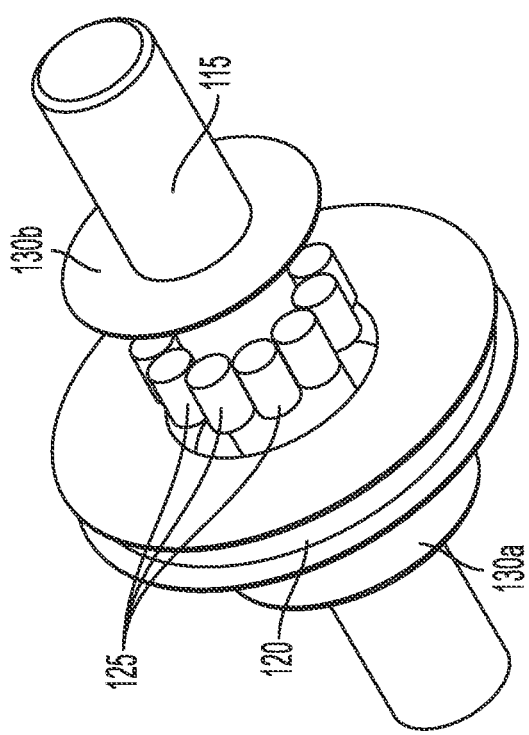
FIG. 1D is a perspective view of the pulley assembly of FIGS. 1A-1C in a partially assembled state.

FIGS. 1A-4B illustrate various pulley assemblies 110, 210, 310, 410. Each of the pulley assemblies 110, 210, 310, 410 include a shaft 115, 215, 315, 415, at least one pulley 120, 220a, 220b, 320a, 320b, 320c, 420a, 420b, 420c, a plurality of rolling elements 125, 225, 325, 425, and washers 130a, 130b, 230a, 230b, 230c, 330a, 330b, 330c, 330d, 430a, 430b, 430c, 430d. Unless described in more detail herein, each of the configurations, such as dimensions, geometries, profiles, function of components, etc., shown and described in FIGS. 1A-4B are generally similar or alike.

The plurality of rolling elements 125, 225, 325, 425 are positioned between an outer diameter or radially outer surface of the shaft 115, 215, 315, 415 and an inner diameter or radially inner surface of the at least one pulley 120, 220a, 220b, 320a, 320b, 320c, 420a, 420b, 420c. The washers 130a, 130b, 230a, 230b, 230c, 330a, 330b, 330c, 330d, 430a, 430b, 430c, 430d are generally arranged on opposite axial ends of the rolling elements 125, 225, 325, 425 to axially secure the rolling elements 125, 225, 325, 425 in an axial direction. The washers 130a, 130b, 230a, 230b, 230c, 330a, 330b, 330c, 330d, 430a, 430b, 430c, 430d can be secured to at least one of the shaft 115, 215, 315, 415 or the at least one pulley 120, 220a, 220b, 320a, 320b, 320c, 420a, 420b, 420c. In one aspect, the washers are not physically secured to the shaft or pulley and can instead be axially secured by bushings on axial ends of the washers. In one aspect, axial snap rings can be arranged outside of the pulley assemblies, one on each axial side. These snap rings can be relatively small and compact, and can have a thickness of 0.1 mm in one aspect.

The plurality of rolling elements 125, 225, 325, 425 include multiple rolling elements that are arranged circumferentially adjacent to each other. In one aspect, the rolling elements are cylindrical rollers. One of ordinary skill in the art would understand that other types of rolling elements, such as ball bearings, tapered rollers, or other rolling elements could be used.

The pulleys 120, 220a, 220b, 320a, 320b, 320c, 420a, 420b, 420c each define a support surface 122, 222a, 222b, 322a, 322b, 322c, 422a, 422b, 422c configured to receive a cable or other traction element. A profile of the support surface 122, 222a, 222b, 322a, 322b, 322c, 422a, 422b, 422c can have a varying radius of curvature. For example, a radius of curvature towards a medial region of the support surface can have a larger radius of curvature than a radius of curvature near a shoulder of the pulley. In one aspect, the profile of the support surface can be non-constant between shoulders defined adjacent to the support surface. In one aspect, this support surface may be constant or have a continuous curvature with the same radius of curvature. Further details are shown in FIG. 1F regarding the support surface 122, and one of ordinary skill in the art would understand that the disclosed characteristics would be the same for the other support surfaces 222a, 222b, 322a, 322b, 322c, 422a, 422b, 422c. The pulley 120 can include shoulders 121', 121" on opposite sides of the support surface 122. A first and second flank 122', 122" can be defined adjacent to the respective shoulders 121', 121". As shown in FIG. 1F, an angle ($\beta$) between the first and second flank 122', 122" is defined. The angle ($\beta$) is approximately 20-40 degrees, in one aspect. The angle ($\beta$) can be 30 degrees, in one aspect. This angle ($\beta$) can be selected to ensure a steep enough incline sufficient to securely hold a cable within the support surface. This angle ($\beta$) can be selected based on the diameter of the cable, in one aspect.

As shown in FIGS. 1A-1F, a single pulley 120 can be provided, in one aspect. In this arrangement, two washers 130a, 130b are provided, including one on each axial end of the rolling elements 125.

As shown in FIGS. 2A and 2B, two pulleys 220a, 220b can be provided. In this arrangement, three washers 230a, 230b, 230c are provided, with two washers 230a, 230b on respective axially outer ends, and a third washer 230c in a medial region between the two pulleys 220a, 220b. As shown in FIG. 2A, a first pulley 220a of the two pulleys can have a first outer diameter, and a second pulley 220b of the two pulleys can have a second outer diameter that is larger than the first outer diameter.

As shown in FIGS. 3A and 3B, three pulleys 320a, 320b, 320c can be provided. In this arrangement, four washers 330a, 330b, 330c, 330d are provided, with two washers 330a, 330b on respective axially outer ends, and medial washers 330c, 330d provided between respective adjacent pulleys 320a, 320b and respective adjacent pulleys 320b, 320c. As shown in FIG. 3A, a first pulley 320a of the three pulleys can have a first outer diameter, a second pulley 320b of the three pulleys can have a second outer diameter that is smaller than the first outer diameter, and a third pulley 320c of the three pulleys can have a third outer diameter. In one aspect, the third outer diameter of the third pulley 320c is greater than the second outer diameter of the second pulley 320b. In one aspect, the third outer diameter of the third pulley 320c is the same or identical to the first outer diameter of the first pulley 320a.

As shown in FIGS. 4A and 4B, three pulleys 420a, 420b, 420c can be provided. In this arrangement, four washers 430a, 430b, 430c, 430d are provided, with two washers 430a, 430b on axially outer ends, and medial washers 430c, 430d provided between adjacent pulleys 420a, 420b and adjacent pulleys 420b, 420c. As shown in FIG. 4A, a first pulley 420a of the three pulleys can have a first outer diameter, a second pulley 420b of the three pulleys can have a second outer diameter that is greater than the first outer diameter, and a third pulley 420c of the three pulleys can have a third outer diameter. In one aspect, the third outer diameter of the third pulley 420c is less than the second outer diameter of the second pulley 420b. In one aspect, the third outer diameter of the third pulley 420c is the same or identical to the first outer diameter of the first pulley 420a.

In one aspect, the shaft 115, 215, 315, 415, the pulley 120, 220a, 220b, 320a, 320b, 320c, 420a, 420b, 420c, the rolling elements 125, 225, 325, 425, and the washers 130a, 130b, 230a, 230b, 230c, 330a, 330b, 330c, 330d, 430a, 430b, 430c, 430d are each formed from stainless steel. One of ordinary skill in the art would understand that other materials can be used. Stainless steel is preferably used for forming each of the components in one aspect such that the components are suitable for cleaning in an autoclave, such as in the medical field, and has sufficient resistance to heat and pressure. In one aspect, the shaft ends are support in external housings or other support components. These support components can be formed from plastic, in one aspect.

Specific dimensions of the pulley assemblies can be selected to provide numerous advantages and improved performance characteristics. Various dimensions are described below.

The pulleys 120, 220b, 320a, 320c, and 420b can have a first relative size or dimension, and pulleys 220a, 320b, 420a, 420c can have a second relative size or dimension. In one aspect, the pulleys 120, 220b, 320a, 320c, and 420b are large pulleys and pulleys 220a, 320b, 420a, 420c are small pulleys. The small pulleys can generally have an outer diameter of 3.0 mm-5.5 mm, in one aspect. The large pulleys can generally have an outer of 4.5 mm-7.5 mm. As used in this instance, the term diameter refers to outermost portion of the small and large pulleys (i.e. the shoulders). In one aspect, a diameter of the large pulleys is at least 30% larger than a diameter of the small pulleys. In one aspect, a diameter of the small pulleys is approximately 70% of a diameter of the large pulleys. In one aspect, the diameter of the large pulleys is at least 40% larger than a diameter of the small pulleys. The inner diameter or radially inner surface of the pulleys, regardless of being large or small, have the same dimensions. Additionally, an axial thickness or length of each of the pulleys can be identical. This allows for the pulleys to be rearranged and modular, and each used with a common sized shaft and rolling elements. Based on the pulleys having an identical inner diameter, each of the pulleys disclosed herein can be interchangeable with each other such that any one of the pulleys can be removed or added to a sub-assembly of the shaft and the rolling elements. This configuration allows a user to add pulleys having different outer diameters or other profiles onto and around a common subset of the rolling elements arranged around the shaft.

Although a large pulley and small pulley are described with respect to the drawings, one of ordinary skill in the art would understand that pulleys that are smaller than the small pulley, larger than the large pulley, or any size in between the small and large pulley can be used.

In one aspect, the rolling elements 125, 225, 325, 425 each have a predetermined length ($L_R$) and a predetermined diameter ($D_R$), which is shown in FIG. 1B. In one aspect, a ratio of the predetermined length ($L_R$) to predetermined diameter ($D_R$) for the rolling elements is at least 1.0. In one aspect, the ratio of $L_R/D_R$ is at least 1.25. In another aspect, the ratio of $L_R/D_R$ is at least 1.33. This ratio is predetermined to optimize load capacity relative to the design envelope or footprint of the assembly.

Clearance (C) between the rolling elements is preferably less than or equal to 0.40 mm. This clearance (C) is shown in FIG. 5, with all of the rolling elements 125 stacked up against each other (i.e. contacting each other), and the clearance (C) is defined as the remaining circumferential distance as measured along the pitch diameter (DM). This value ensures that skewing of the rolling elements is limited and reduced.

In one aspect, as shown in FIG. 5, a ratio of a quantity of rolling elements to the pitch diameter (DM) is greater than 4.5. This ratio is used to maximize the number of rolling elements for load capacity. By maximizing the number of rollers for a given pitch diameter, it is possible to reduce the total circumferential clearance for the full complement rolling element set, thereby reducing the amount of skewing of the roller set. A full complement of rolling elements can be provided between the raceways defined by the shaft and the pulleys. This provides an optimal load capacity by maximizing the rolling elements.

Regarding the shaft, the shaft length (shown as ($L_S$) in FIG. 1E) is preferably approximately twice the outer pulley diameter ($D_P$). In one aspect, the shaft length ($L_S$) can be 10.0 mm-12.0 mm and the outer pulley diameter ($D_P$) can be 5.0 mm-7.0 mm, particularly for a relatively larger pulley. In another aspect, the outer pulley diameter can be 3.5 mm-5.0 mm for a relatively smaller pulley. In one aspect, the outer pulley diameter ($D_P$) is 30%-60% of a length ($L_S$) of the shaft. In one aspect, the outer pulley diameter ($D_P$) is 40%-60% of a length ($L_S$) of the shaft. In another aspect, the outer pulley diameter ($D_P$) is 30%-50% of a length ($L_S$) of the shaft.

A width of the bearing, which is measured between outer axial faces of the opposing end washers, can be designed to be compact and minimal. For example, for the single pulley configuration shown in FIGS. 1A-1F, the bearing width ($W_{B1}$) can be approximately 1.0 mm. For a double pulley assembly, such as shown in FIGS. 2A and 2B, the bearing width ($W_{B2}$) can be approximately 2.0 mm. For a triple pulley assembly, such as shown in FIGS. 3A-4B, the bearing width ($W_{B3}$) can be approximately 3.0 mm. In one aspect, a bearing width defined between axially outer faces of the outermost washers is less than 30% of the shaft length for a triple pulley assembly. The bearing width can be less than 20% of the shaft length in configurations with two pulleys, and can be less than 10% of the shaft length in configurations with a single pulley. One of ordinary skill in the art would understand that these dimensions can vary depending on the particular requirements for an application.

In one aspect, a width of the bearing is less than 10% of a length of the shaft for a single pulley configuration. The width of the bearing can be less than 20% of a length of the shaft in another embodiment that includes two pulleys, and less than 30% of a length of the shaft in yet another embodiment that includes three pulleys.

In one aspect, the present configuration provides an improved modular style pulley assembly in which users or other personnel can manually rearrange the quantity and size of pulleys being supported on the shaft via the rolling elements. Various configurations are possible, such as a single pulley assembly with either a large or small pulley, a double pulley assembly including either a small/small pulley combination, small/large pulley combination, large/small pulley combination, or large/large pulley combination. A triple pulley assembly configuration can also be used, including any combination of large and small pulleys.

Each of the pulley assemblies disclosed herein reduce friction as compared to pulley arrangements in which a pulley is directly supported on a coated pin or shaft. In one aspect, each of the components of the assembly lack any coating or outer surface treatment and are considered non-coated elements or parts. This is preferable due to the parts being configured to be sanitized via high heat applications, such as via an autoclave.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS pulley assembly 110, 210, 310, 410
shaft 115, 215, 315, 415
pulley 120, 220a, 220b, 320a, 320b, 320c, 420a, 420b, 420c
shoulders 121', 121"
flanks 122', 122"
rolling elements 125, 225, 325, 425
washers 130a, 130b, 230a, 230b, 230c, 330a, 330b, 330c, 330d, 430a, 430b, 430c, 430d

What is claimed is:
1. A pulley assembly comprising:
a shaft having a shaft length;

a plurality of rolling elements supported on a radially outer surface of the shaft, wherein the plurality of rolling elements are cylindrical rollers, and the cylindrical rollers each have a rolling element length and a rolling element diameter, and a ratio of the rolling element length to the rolling element diameter is at least 1.0;

at least one pulley configured to surround the plurality of rolling elements, the at least one pulley defining an outer raceway for the plurality of rolling elements, the at least one pulley defining a support surface configured to support a cable, wherein an outer diameter of the at least one pulley is 30%-60% of the shaft length; and at least one pair of washers arranged on axially opposite outer sides of the at least one pulley and the plurality of rolling elements.

2. The pulley assembly according to claim 1, wherein the ratio of the rolling element length to the rolling element diameter of the plurality of rolling elements is at least 1.33.

3. The pulley assembly according to claim 1, wherein the rolling elements are configured to be circumferentially supported against each other, and a clearance is defined between a pitch diameter of the plurality of rolling elements that is less than 0.40 mm.

4. The pulley assembly according to claim 1, wherein the shaft, the plurality of rolling elements, the at least one pulley, and the at least one pair of washers are each formed from steel.

5. The pulley assembly according to claim 1, wherein the at least one pulley includes a single pulley.

6. The pulley assembly according to claim 1, wherein the at least one pulley includes a first pulley and a second pulley, the first pulley has a first outer diameter and a first inner diameter, the second pulley has a second outer diameter and a second inner diameter, the first and second outer diameters are different and the first and second inner diameters are identical such that the first and second pulley are each configured to be supported around a common subset of the plurality of rolling elements arranged around the shaft.

7. The pulley assembly according to claim 6, wherein at least one additional washer is arranged between the first and the second pulley.

8. The pulley assembly according to claim 6, wherein the first outer diameter is at least 40% larger than the second outer diameter.

9. The pulley assembly according to claim 1, wherein the at least one pulley includes a first pulley, a second pulley, and a third pulley, wherein the first pulley and the third pulley each have a first outer diameter, and the second pulley has a second outer diameter that is different than the first outer diameter.

10. The pulley assembly according to claim 9, wherein at least one first additional washer is arranged between the first and second pulley and at least one second additional washer is arranged between the second and third pulley.

11. The pulley assembly according to claim 1, wherein the support surface of the at least one pulley has a varying radius of curvature, and a first and second flank defined on opposing areas defined adjacent to respective shoulders of the at least one pulley.

12. The pulley assembly according to claim 11, wherein an angle defined between the first and second flanks is 20 degrees-40 degrees.

13. The pulley assembly according to claim 1, wherein a bearing width defined between axially outer faces of the at least one pair of washers is less than 30% of the shaft length.

14. The pulley assembly according to claim 1, wherein the at least one pulley includes a plurality of pulleys that each have an identical inner diameter and are each configured to be interchangeably supported on a common subset of the plurality of rolling elements arranged around the shaft.

15. A pulley assembly comprising:

a shaft having a shaft length;

a plurality of rolling elements supported on a radially outer surface of the shaft, wherein the plurality of rolling elements are cylindrical rollers, and the cylindrical rollers each have a rolling element length and a rolling element diameter, and a ratio of the rolling element length to the rolling element diameter is at least 1.0;

at least one pulley configured to surround the plurality of rolling elements, the at least one pulley defining an outer raceway for the plurality of rolling elements, the at least one pulley defining a support surface configured to support a cable wherein an outer diameter of the at least one pulley is 30%-60% of the shaft length; and at least one pair of washers arranged on axially opposite outer sides of the at least one pulley and the plurality of rolling elements, wherein a bearing width defined between axially outer faces of the at least one pair of washers is less than 30% of the shaft length, and the shaft, the plurality of rolling elements, the at least one pulley, and the at least one pair of washers are each formed from steel.

16. The pulley assembly according to claim 15, wherein the support surface of the at least one pulley has a varying radius of curvature, and a first and second flank defined on opposing areas defined adjacent to respective shoulders of the at least one pulley.

17. The pulley assembly according to claim 15, wherein the ratio of the rolling element length to the rolling element diameter of the plurality of rolling elements is at least 1.33.

18. The pulley assembly according to claim 15, wherein the rolling elements are configured to be circumferentially supported against each other, and a clearance is defined between a pitch diameter of the plurality of rolling elements that is less than 0.40 mm.

19. The pulley assembly according to claim 15, wherein the at least one pulley includes a first pulley, a second pulley, and a third pulley, wherein the first pulley and the third pulley each have a first outer diameter, and the second pulley has a second outer diameter that is different than the first outer diameter, and the first, second, and third pulley each have an identical inner diameter such that the first, second, and third pulley are each configured to be supported on a common subset of the plurality of rolling elements arranged around the shaft.

20. The pulley assembly according to claim 18, wherein at least one first additional washer is arranged between the first and second pulley and at least one second additional washer is arranged between the second and third pulley.

* * * * *